(12) United States Patent
Kwatra et al.

(10) Patent No.: US 12,223,946 B2
(45) Date of Patent: Feb. 11, 2025

(54) ARTIFICIAL INTELLIGENCE VOICE RESPONSE SYSTEM FOR SPEECH IMPAIRED USERS

(71) Applicant: INTERNATIONAL BUSINESS MACHINES CORPORATION, Armonk, NY (US)

(72) Inventors: Shikhar Kwatra, San Jose, CA (US); Laura Grace Ellis, Austin, TX (US); Kaitlin McGoldrick, New York, NY (US); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 176 days.

(21) Appl. No.: 16/948,310

(22) Filed: Sep. 11, 2020

(65) Prior Publication Data

US 2022/0084504 A1 Mar. 17, 2022

(51) Int. Cl.
*G10L 15/08* (2006.01)
*G06F 3/16* (2006.01)
(Continued)

(52) U.S. Cl.
CPC .............. *G10L 15/08* (2013.01); *G06F 3/167* (2013.01); *G06N 3/04* (2013.01); *G10L 15/063* (2013.01);
(Continued)

(58) Field of Classification Search
CPC ....... G10L 15/08; G10L 15/063; G10L 15/30; G10L 2015/088; G06F 3/167; G06N 3/04
See application file for complete search history.

(56) References Cited

U.S. PATENT DOCUMENTS 8,004,398 B2 * 8/2011 Chriss .................... G16H 80/00
340/286.07
8,661,112 B2   2/2014 Creamer
(Continued)

FOREIGN PATENT DOCUMENTS

CN   104110770 A   12/2016
CN   110875032 A    3/2020
(Continued)

OTHER PUBLICATIONS

Chan, Rosanna Yuen-Yan, Junnan Ding, Lam Wang Kong, Gladys Yan, Xue Bai, Xiaojuan Ma, Soby So, Xiangjie Wang, and Jessica Tsz Ching Chow, "Making Telecommunications Services Accessible to People with Severe Communication Disabilities", 2016, 2016 IEEE Global Humanitarian Technology Conf., pp. 105-112. (Year: 2016).*
Sowah, Robert, Ryan Friedman, Abdul R. Ofoli, and Baffour Sarkodie-Mensah, "Think to Speak—A Piezoelectric-EEG system for Augmentative and Alternative Communication (AAC) using Recurrent Neural Networks", 2019, 2019 IEEE Industry Applications Society Annual Meeting, 2019, pp. 1-6. (Year: 2019).*
(Continued)

*Primary Examiner* — Daniel C Washburn
*Assistant Examiner* — James Boggs
(74) *Attorney, Agent, or Firm* — Jordan T. Schiller (57) ABSTRACT

A method, computer system, and a computer program product for voice responses is provided. The present invention may include gathering user data from at least one connected device. The present invention may include training a voice response system based on the gathered user data. The present invention may include identifying a wakeup signal based on the trained voice response system. The present invention may include determining that user engagement is intended based on identifying the wakeup signal. The present invention may include engaging with the user through the at least one connected device.

23 Claims, 5 Drawing Sheets

(51) Int. Cl.
- *G06N 3/04* (2023.01)
- *G10L 15/06* (2013.01)
- *G10L 15/30* (2013.01)

(52) U.S. Cl.
CPC ........ *G10L 15/30* (2013.01); *G10L 2015/088* (2013.01)

(56) References Cited

U.S. PATENT DOCUMENTS

| | | | |
|---|---|---|---|
| 8,918,086 B2* | 12/2014 | Thange | H04W 8/28 |
| | | | 455/421 |
| 9,374,464 B1* | 6/2016 | Demsey | H04M 3/4936 |
| 9,548,050 B2 | 1/2017 | Gruber | |
| 9,729,690 B2* | 8/2017 | Byrne | H04M 1/645 |
| 9,785,891 B2 | 10/2017 | Agarwal | |
| 10,262,555 B2* | 4/2019 | Campbell | G06F 40/274 |
| 10,346,542 B2 | 7/2019 | Wooters | |
| 10,510,266 B1* | 12/2019 | Huynh | G06F 3/167 |
| 10,614,800 B1* | 4/2020 | McMahon | G06F 3/0481 |
| 10,713,343 B2* | 7/2020 | Kawakita | G06F 3/167 |
| 11,284,844 B2* | 3/2022 | Schorey | A61B 5/389 |
| 11,741,945 B1* | 8/2023 | Sullivan | G10L 15/07 |
| | | | 704/270.1 |
| 2013/0065204 A1 | 3/2013 | Lostracco | |
| 2013/0204813 A1 | 8/2013 | Master | |
| 2016/0260436 A1 | 9/2016 | Lemay | |
| 2016/0364441 A1 | 12/2016 | Nguyen | |
| 2017/0160813 A1 | 6/2017 | Divakaran | |
| 2017/0289766 A1 | 10/2017 | Scott | |
| 2018/0197439 A1* | 7/2018 | Gordon | G09B 19/04 |
| 2018/0211175 A1 | 7/2018 | Mendels | |
| 2018/0268309 A1* | 9/2018 | Childress | G06F 40/237 |
| 2019/0066680 A1* | 2/2019 | Woo | G10L 15/08 |
| 2019/0347389 A1* | 11/2019 | Kawakita | G06F 21/32 |
| 2019/0348047 A1* | 11/2019 | Li | G10L 15/30 |
| 2020/0201970 A1* | 6/2020 | Lesso | G10L 17/04 |
| 2020/0219497 A1* | 7/2020 | Castelli | G10L 15/30 |
| 2020/0219498 A1* | 7/2020 | Mukherjee | G06N 3/08 |
| 2020/0273448 A1* | 8/2020 | Min | G10L 15/16 |
| 2021/0035563 A1* | 2/2021 | Cartwright | G10L 15/16 |
| 2021/0142189 A1* | 5/2021 | Subramanya | G06N 5/04 |
| 2021/0174795 A1* | 6/2021 | Robert Jose et al. | G06F 3/165 |
| 2021/0327418 A1* | 10/2021 | Kim | G06F 21/32 |
| 2021/0406218 A1* | 12/2021 | Margolin | G06N 3/08 |

FOREIGN PATENT DOCUMENTS

| | | |
|---|---|---|
| CN | 111310847 A | 6/2020 |
| WO | 2022053926 A1 | 3/2022 |

OTHER PUBLICATIONS

Kandpal, Prathamesh, Kapil Jasnani, Ritesh Raut, and Siddharth Bhorge, "Contextual Chatbot for Healthcare Purposes using Deep Learning", Jul. 2020, 2020 Fourth World Conference on Smart Trends in Systems, Security and Sustainability (WorldS4), pp. 625-634. (Year: 2020).*

"Method and System for Utilizing an Artificial Intelligence (AI) Voice Response System to Derive Relevant Body Language and Augmented Context of a User", Jun. 2019, An IP.com Prior Art Database Technical Disclosure, https://ip.com/IPCOM/000258713. (Year: 2019).*

"Personalizing Voice Menu of IVR Systems", Feb. 2005, An IP.com Prior Art Database Technical Disclosure, https://ip.com/IPCOM/000078039, pp. 1-4. (Year: 2005).*

"Proloquo2Go Manual Version 4", Apr. 2015, AssistiveWare, pp. 1-81. (Year: 2015).*

Waller, Annalu, "Telling Tales: Unlocking the Potential of AAC Technologies", Mar. 2019, International Journal of Language & Communication Disorders, vol. 54, No. 2, pp. 159-169. (Year: 2019).*

Sehgal, Rohit Raj, Shubham Agarwal, and Gaurav Raj, "Interactive Voice Response using Sentiment Analysis in Automatic Speech Recognition Systems", Jun. 2018, 2018 International Conference on Advances in Computing and Communication Engineering (ICACCE-2018), pp. 213-218. (Year: 2018).*

Disclosed Anonymously, "Interaction with smart assistants using alternative and augmentative communication," IP.com, May 18, 2018, 11 pages, IP.com No. IPCOM000253962D Retrieved from the Internet: <URL: https://priorart.ip.com/IPCOM/000253962>.

Dislcosed Anonymously, "Quantitative Voice Response System to Submit Contextual Relevant Mixed Voice and Body Gestures,", IP.com, Jun. 14, 2018, 5 pages, IP.com No. IPCOM000254251D, Retrieved from the Internet: <URL: https://priorart.ip.com/IPCOM/000254251>.

Mell, et al., "The NIST Definition of Cloud Computing", National Institute of Standards and Technology, Special Publication 800-145, Sep. 2011, 7 pages.

Wolters, et al., "Designing a spoken dialogue interface to an intelligent cognitive assistant for people with dementia," Health Informatics Journal, 2016, pp. 854-866, vol. 22, No. 4, DOI: 10.1177/1460458215593329, Retrieved from the Internet: <URL: https://journals.sagepub.com/doi/full/10.1177/1460458215593329>.

Notification of Transmittal of the International Search Report and the Written Opinion of the International Searching Authority, or the Declaration, International application No. PCT/IB2021/058096, Mailed on Dec. 14, 2021, 9 pages.

* cited by examiner

ARTIFICIAL INTELLIGENCE VOICE RESPONSE SYSTEM FOR SPEECH IMPAIRED USERS

BACKGROUND

The present invention relates generally to the field of computing, and more particularly to virtual assistants.

Speech disorders, including speech impediments and/or other speech articulation disorders may result in an inability to construct language and/or to utilize appropriate words to formulate a voice command which may be understandable by an artificial intelligence (AI) voice response system. Illnesses resulting in fatigue and/or other bodily conditions may also effect an inability of an individual to submit a voice command and/or to speak an elaborate request to an AI voice response system.

SUMMARY

Embodiments of the present invention disclose a method, computer system, and a computer program product for voice responses. The present invention may include gathering user data from at least one connected device. The present invention may include training a voice response system based on the gathered user data. The present invention may include identifying a wakeup signal based on the trained voice response system. The present invention may include determining that user engagement is intended based on identifying the wakeup signal. The present invention may include engaging with the user through the at least one connected device.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product for voice responses. As such, the present embodiment has the capacity to improve the technical field of voice response systems by enabling speech impaired users to communicate with the voice response systems using one or more connected devices, including alternative and augmentative communication devices. More specifically, the present invention may include gathering user data from at least one connected device. The present invention may include training a voice response system based on the gathered user data. The present invention may include identifying a wakeup signal based on the trained voice response system. The present invention may include determining that user engagement is intended based on identifying the wakeup signal. The present invention may include engaging with the user through the at least one connected device.

As described previously, speech disorders, including speech impediments and/or other speech articulation disorders may result in an inability to construct language and/or to utilize appropriate words to formulate a voice command which may be understandable by an artificial intelligence (AI) voice response system. Illnesses resulting in fatigue and/or other bodily conditions may also effect an inability of an individual to submit a voice command and/or to speak an elaborate request to an AI voice response system.

Therefore, it may be advantageous to, among other things, provide a means by which an artificial intelligence (AI) system may observe human conversations, including but not limited to ambient conversations, and may utilize behavioral and/or biometric signals to learn menu options and to generate customized voice menus which may assist speech impaired users in executing intended voice responses or voice commands.

According to at least one embodiment, an artificial intelligence (AI) system may predict when and whether a user may desire to submit a voice command and/or may have an inability to submit a voice command.

According to at least one embodiment, heuristics and/or health conditions of the user may be taken into consideration in predicting when and whether a user may desire to submit a voice command and/or may have an inability to submit a voice command. Heuristics and/or health conditions of the user may also be used to predict a topic of a voice command and/or voice request and, optionally, to provide a spoken menu to the user from which the user may choose at least one appropriate voice command.

According to at least one embodiment, the voice response program may ensure that users' voice response data and/or integrated data sources may not be used in any other systems without the user's full knowledge and approval. Through system integrations, users of the voice response program may be given the option to integrate tools such IoT biometric sensors, augmentative and alternative communication devices (AAC devices), and/or video streams to provide enhanced functionality and to further train the user's own instance of the voice response program. The integration process with the voice response program may be explicitly opt in and any gathered data may not be not shared outside of the user's own personal instance of the voice response program.

Figure 1:
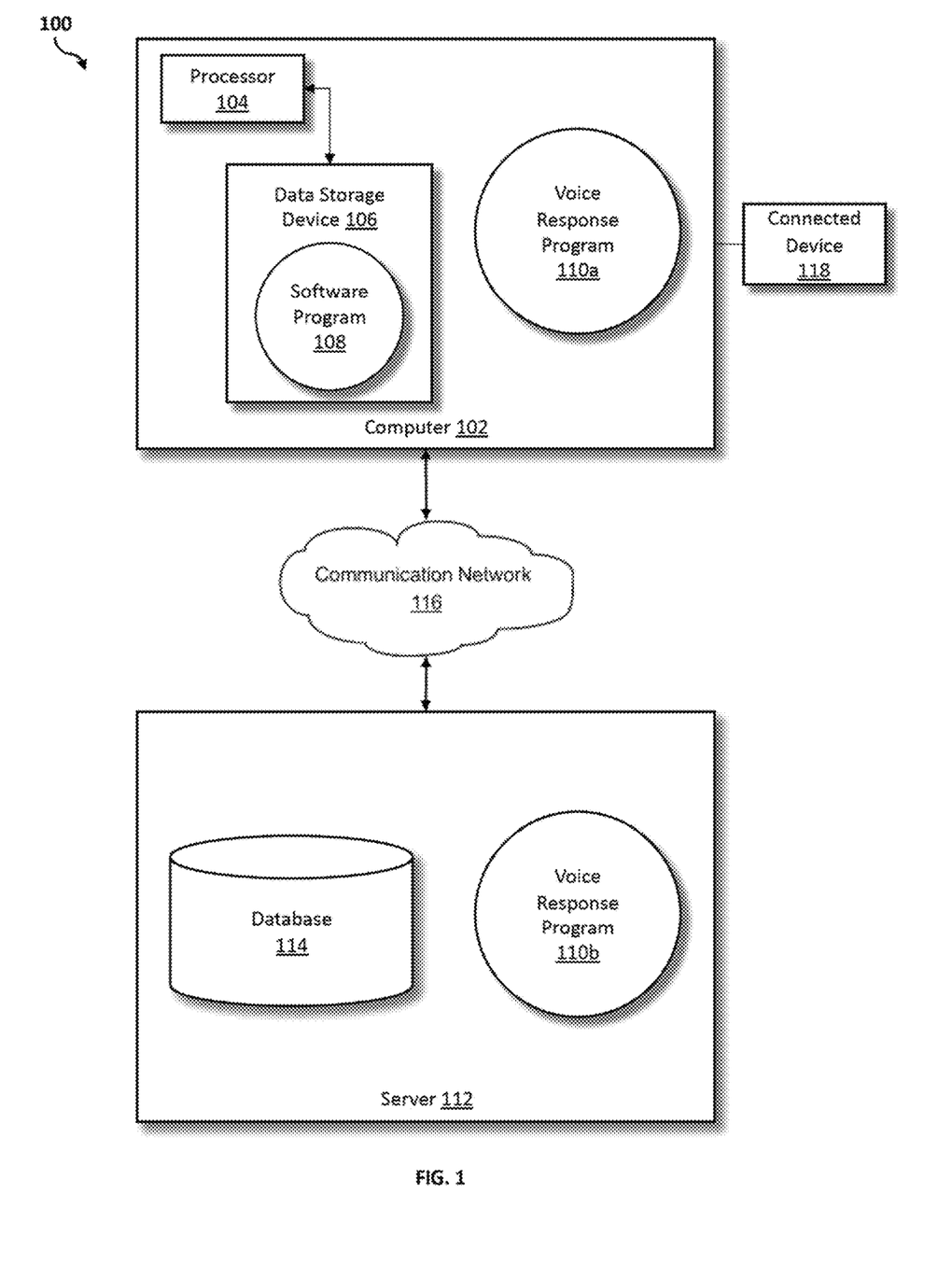
FIG. 1 illustrates a networked computer environment according to at least one embodiment.

Referring to FIG. 1, an exemplary networked computer environment 100 in accordance with one embodiment is depicted. The networked computer environment 100 may include a computer 102 with a processor 104 and a data storage device 106 that is enabled to run a software program 108 and a voice response program 110a. The networked computer environment 100 may also include a server 112 that is enabled to run a voice response program 110b that may interact with a database 114 and a communication network 116. The networked computer environment 100 may include a plurality of computers 102 and servers 112, only one of which is shown. The communication network 116 may include various types of communication networks, such as a wide area network (WAN), local area network (LAN), a telecommunication network, a wireless network, a public switched network and/or a satellite network. The connected device 118 is depicted as shown as its own separate entity but may be integrated into another part of the computer network environment. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with the server computer 112 via the communications network 116. The communications network 116 may include connections, such as wire, wireless communication links, or fiber optic cables. As will be discussed with reference to FIG. 3, server computer 112 may include internal components 902a and external components 904a, respectively, and client computer 102 may include internal components 902b and external components 904b, respectively. Server computer 112 may also operate in a cloud computing service model, such as Software as a Service (SaaS), Platform as a Service (PaaS), or Infrastructure as a Service (IaaS). Server 112 may also be located in a cloud computing deployment model, such as a private cloud, community cloud, public cloud, or hybrid cloud. Client computer 102 may be, for example, a mobile device, a telephone, a personal digital assistant, a netbook, a laptop computer, a tablet computer, a desktop computer, or any type of computing devices capable of running a program, accessing a network, and accessing a database 114. According to various implementations of the present embodiment, the voice response program 110a, 110b may interact with a database 114 that may be embedded in various storage devices, such as, but not limited to a computer/mobile device 102, a networked server 112, or a cloud storage service.

According to the present embodiment, a user using a client computer 102 or a server computer 112 may use the voice response program 110a, 110b (respectively) to enable speech impaired users to communicate with voice response systems using one or more connected devices (e.g., connected device 118), including alternative and augmentative communication devices. The voice response method is explained in more detail below with respect to FIG. 2.

Figure 2:
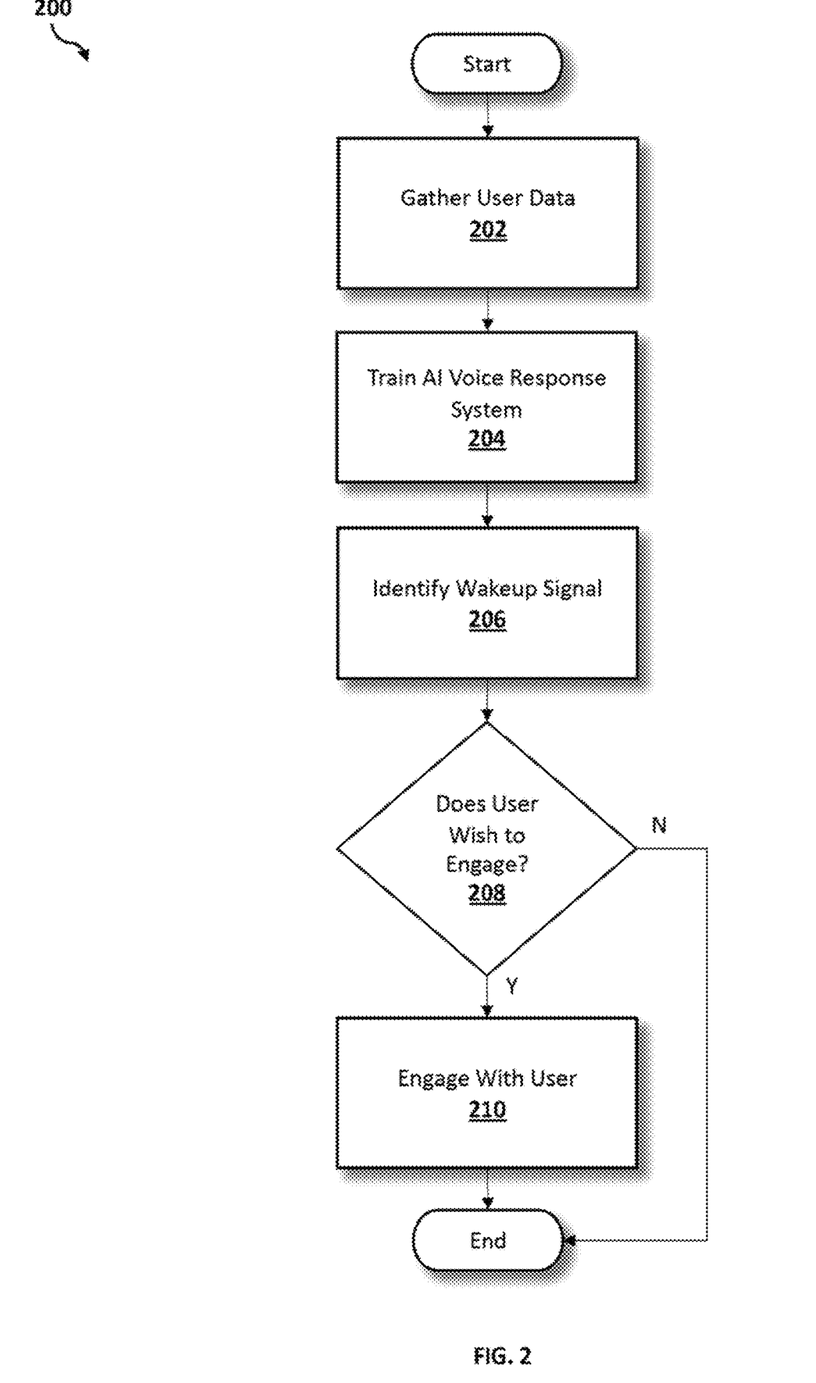
FIG. 2 is an operational flowchart illustrating a process for voice responses according to at least one embodiment.

Referring now to FIG. 2, an operational flowchart illustrating the exemplary voice response process 200 used by the voice response program 110a and 110b according to at least one embodiment is depicted.

At 202, the voice response program 110a, 110b gathers user data. A data gathering module of the voice response program 110a, 110b may collect data, including but not limited to historical behavioral data and/or conversational data, as well as new data fed by connected devices (e.g., connected device 118) of the user and collected in real time.

The data gathering module may ingest behavioral, biometric, and/or mobility pattern data from a speech impaired user and/or any other user and may store the ingested (i.e., collected) data in a knowledge corpus (e.g., database 114).

Wearable devices, including Internet of Things (IoT) connected rings, glasses, clothing (e.g., with heart and/or respiration sensors), watches, shoes, and/or fitness trackers, among other things, may feed data to the data gathering module, which data may include camera feed data and/or any other IoT biometric sensor device data.

Data may also be collected from a variety of (e.g., a combination of) augmentative and alternative communication (AAC) devices. An AAC device may be a device which enables and/or facilitates communication for impairment and/or disability pattern(s) displayed by individuals with expressive communication disorder(s). Augmentative communication devices may be used by individuals who have some speech but are either unable to be understood or have a limited speaking ability. Alternative communication devices may be used by individuals who have no speech and may rely on another method of communication to express their thoughts (e.g., wants, needs, among other things).

Data may be collected from video devices and/or speech streaming devices. A raw video stream of data, once gathered, may be passed through an image and/or video processing system to classify indicators of engagement for model input (e.g., to identify raised hands, eyes blinking, etc.). The image and/or video processing system may be IBM's Watson™ (Watson and all Watson-based trademarks are trademarks or registered trademarks of International Business Machines Corporation in the United States, and/or other countries) Visual Recognition solution, among other solutions. The Watson™ Visual Recognition solution may use deep learning algorithms to analyze images for faces (e.g., facial recognition), scenes, objects, and/or any other content, and to tag, classify and search the analyzed visual content.

Raw speech stream data collected from a speech streaming device may be passed through a speech to text processor such as Watson™ speech to text so that the content may be analyzed with natural language processing (NLP) algorithms. NLP algorithms such as Watson™ tone analyzer (e.g., to dynamically determine a satisfaction or frustration level of a user) and sentiment analysis (e.g., to determine whether a user is temperamental, angry, disappointed, sad, or happy, among other things) application programming interfaces (API's) as well as Watson™ natural language classifier (e.g., to gather speech content and keyword indicator data) may be used.

For example, the voice response program 110a, 110b may be utilized and trained at a medical facility where at least one user of the voice response program 110a, 110b is speech impaired and cannot render a spoken command. The data gathered by the voice response program 110a, 110b, in this instance, may include both commands spoken by the speech impaired user and/or commands spoken by any part of the medical support team, as well as a resulting change in behavior and/or biometric parameter(s) identified by a connected and/or wearable device.

At 204, the voice response system is trained based on the gathered data. A long short-term memory (LSTM) recurrent neural network (RNN) for time-series sequencing (e.g., for connected sequencing patterns such as speech) may be used to predict an intended topic (i.e., a topic, a user topic) of a voice request of a speech impaired user, among other users.

The data gathered by the data gathering module, as described previously with respect to step 202 above, may be interpreted to identify behavioral, biometric, and/or mobility pattern data of the user (e.g., a speech impaired user and/or any other user of the voice response program 110a, 110b) and to predict an intended topic and/or request of a user. This may be done further using the LSTM-RNN model, which will be described in more detail with respect to step 208 below.

At 206, a wakeup signal is identified. Once the knowledge corpus (e.g., database 114) is matured (e.g., once sufficient data has been gathered to make a knowledge-based prediction regarding a future outcome), then any data gathered by a connected device (e.g., a connected wearable device, an IoT sensor, a camera, among other things) which tracks a change in a behavior and/or a biometric parameter of a speech impaired user may awaken the artificial intelligence (AI) device and trigger the device's engagement with the user.

A connected IoT device may passively listen to a user's conversation until a wakeup signal is identified and may only begin to store data once the wakeup signal is identified. However, a user of the voice response program 110a, 110b may turn a listening feature off, and may trigger a connected IoT device to begin listening only when a command is issued.

At 208, the voice response program 110a, 110b determines that the user wishes to engage with a connected device. Upon wakeup of the artificial intelligence (AI) device, all data gathered by connected devices may be passed to a random forest algorithm to perform a binary classification (e.g., to classify the data to interpret whether the user wishes or does not wish to engage with the system on the basis of a classification rule). For example, the voice response program 110a, 110b may take all input from the data gathering module and may run the input through a random forest model to decide whether the input is needed (e.g., whether the user wishes to engage) using a binary classification (e.g., where 0 represents data that is not needed and the user does not wish to engage and 1 represents data that is needed and the user does wish to engage).

If the voice response program 110a, 110b determines, based on the classification rule, that the user wishes to engage with the system, then the gathered data may be passed to a deep reinforcement learning model (i.e., the LSTM-RNN model) to determine how to proceed on engaging with the user.

A user's acceptance or decline to engage with the voice response program 110a, 110b may be fed back into the deep reinforcement learning model to further tune the model. Negative user feedback may act as a penalty and positive user feedback may act as a reward. The deep reinforcement learning model may act as a feedback loop and may classify data as positive or negative in order to adjust the model further towards a desired outcome. This may assist the deep reinforcement learning model in adjusting the current state and determining a future action for engagement with the voice response program 110a, 110b.

At 210, the voice response program 110a, 110b engages with a user. In order to engage with the speech impaired user (i.e., the user), the voice response program 110a, 110b may provide the user with a customized menu related to a predicted topic. The voice response program may consider behavioral and/or biometric signals gathered by the data gathering module, as described previously with respect to step 202 above, to determine a voice request which may be executed. User feedback, including agreement and/or disagreement feedback (e.g., positive and/or negative biometric and/or behavioral data received as a result of posed questions) may be analyzed while a voice menu is being navigated. A voice menu may be navigated by the voice response program 110a, 110b until a customized menu related to a predicted topic may be determined, and accordingly, a voice command may be executed.

Continuing with the example from 202 above, a speech impaired user in a medical facility may be asked, "are you hungry" and "are you thirsty." A visual signal may be identified (e.g., a facial expression made by the user) after the question "are you thirsty," and the next set of questions may include, "do you want water," and "do you want tea." This data (e.g., video data), observed by a connected and/or wearable device of the voice response program 110a, 110b may be used to generate the knowledge corpus, and to identify an intended topic as well as an associated hierarchical voice menu.

A LSTM-RNN model may be used here to process a user's speech and to decide how to proceed based on the user's speech. The LSTM-RNN model may be an artificial recurrent neural network architecture used in the field of deep learning, which functions based on feedback connections unlike the standard feedforward neural networks. The LSTM-RNN model may not only process single data points (e.g., images obtained of the user by connected device(s)) but may also process entire sequences of data (e.g., speech or video of the user's interaction with the device(s)). For example, LSTM-RNN models may be applied to tasks such as unsegmented speech recognition, handwriting recognition, and anomaly detection in network traffic or intrusion detection systems.

In the present application, the LSTM-RNN model may be used to process the voice request of a user by breaking down observed parts of speech into sequential, dependent input to predict a user's intended topic. This speech-to-text capability may function such that the inputted speech may be the sequential, dependent input, and the predicted intended topic may be the resulting output based on the LSTM-RNN model.

The LSTM-RNN model may be used here to improve the knowledge corpus (e.g., the database 114) by correlating gathered behavioral input, body language, and/or biometric signals with an intended topic and/or a hierarchical voice menu related to the intended topic.

In order to correlate data with certain aspects of a voice menu, the voice menu may be defined and/or identified in the knowledge corpus (e.g., the database 114). The voice response program 110a, 110b may identify an appropriate voice menu based on gathered data, for example, by identifying commands that are most common given the type of data that is received (e.g., based on the specific behavioral input and/or biometric signals, among other things).

According to at least one embodiment, based on engagement with the user, the voice response program 110a, 110b may dynamically create a voice menu over time, and may begin by using preexisting voice menus that are associated with particular domains on the connected IoT device(s). For example, if the user says, "Alexa set a timer," then the IoT device may respond by starting the user down a related preexisting "timer" heirarchial voice menu by asking, "what do you want the timer to be called," and "how much time," among other things. The voice response program 110a, 110b may learn to interact with a preexisting voice menu based on a user's further commands such as "set time," "set stop point," "remind me," or "don't let me forget," among other things. Based on receipt of these related commands, the voice response program 110a, 110b may know to put the user in the "timer" heirarchial voice menu, as described above.

Behavioral and/or biometric data, including spoken texture and/or sound, may be interpreted as being related to a user's activity (e.g., eating, drinking, watching television, and/or listening to songs, among many other things) and the menu may be customized accordingly. Patterns in a user's behavior (i.e., behavioral patterns) may assist in identifying the intended topic, as described previously with respect to step 202 above, and the voice response program 110a, 110b may create a hierarchical set of questions based on an observed interaction or set of interactions with the impaired user and the artificial intelligence (AI) device.

According to at least one embodiment, the voice response program 110a, 110b may handle a non-routine event (e.g., an observed bodily movement which differs from the user's normal bodily movement(s), as determined by the voice response program 110a, 110b and/or any connected device (s), or an event for which there is no prior data relating to the user's request which can be used by the voice response program 110a, 110b) by beginning with a set of patterns (e.g., present health conditions and/or heuristics of the user), either preexisting (e.g., preconfigured on the IoT device) or learned based on user interactions and/or observed behaviors, and/or may initiate a telephone call to a live person (e.g., a person configured in a user's profile of the voice response program 110a, 110b) who may assist the voice response program 110a, 110b in understanding the non-routine event.

If, at 208, the voice response program 110a, 110b determine that the user did not wish to engage, then the program would end.

It may be appreciated that FIG. 2 provides only an illustration of one embodiment and does not imply any limitations with regard to how different embodiments may be implemented. Many modifications to the depicted embodiment(s) may be made based on design and implementation requirements.

Figure 3:
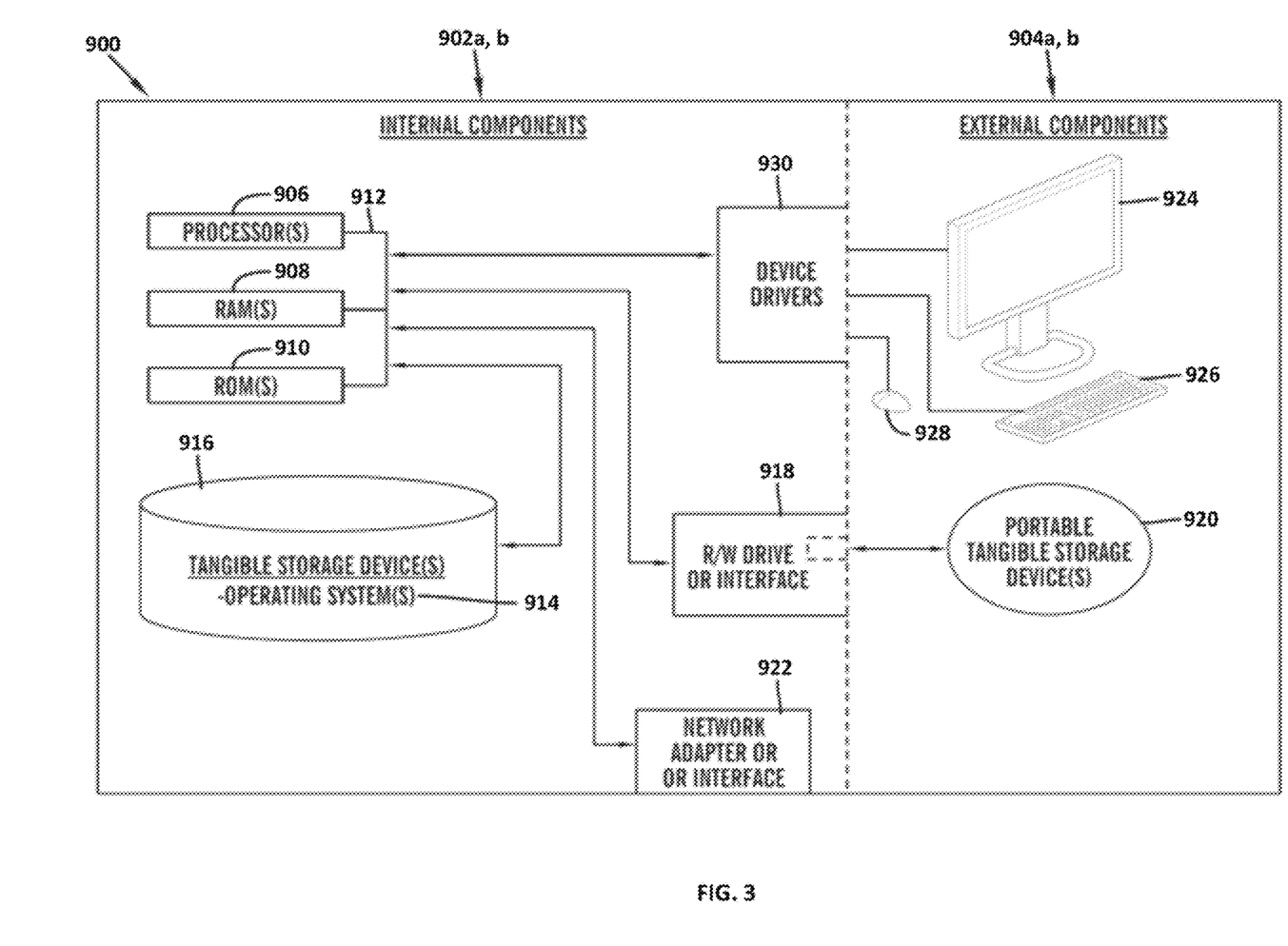
FIG. 3 is a block diagram of internal and external components of computers and servers depicted in FIG. 1 according to at least one embodiment.

FIG. 3 is a block diagram 900 of internal and external components of computers depicted in FIG. 1 in accordance with an illustrative embodiment of the present invention. It should be appreciated that FIG. 3 provides only an illustration of one implementation and does not imply any limitations with regard to the environments in which different embodiments may be implemented. Many modifications to the depicted environments may be made based on design and implementation requirements.

Data processing system 902, 904 is representative of any electronic device capable of executing machine-readable program instructions. Data processing system 902, 904 may be representative of a smart phone, a computer system, PDA, or other electronic devices. Examples of computing systems, environments, and/or configurations that may be represented by data processing system 902, 904 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 and network server 112 may include respective sets of internal components 902 a, b and external components 904 a, b illustrated in FIG. 3. Each of the sets of internal components 902 a, b includes one or more processors 906, one or more computer-readable RAMs 908 and one or more computer-readable ROMs 910 on one or more buses 912, and one or more operating systems 914 and one or more computer-readable tangible storage devices 916. The one or more operating systems 914, the software program 108, and the voice response program 110a in client computer 102, and the voice response program 110b in network server 112, may be stored on one or more computer-readable tangible storage devices 916 for execution by one or more processors 906 via one or more RAMs 908 (which typically include cache memory). In the embodiment illustrated in FIG. 3, each of the computer-readable tangible storage devices 916 is a magnetic disk storage device of an internal hard drive. Alternatively, each of the computer-readable tangible storage devices 916 is a semiconductor storage device such as ROM 910, EPROM, flash memory or any other computer-readable tangible storage device that can store a computer program and digital information.

Each set of internal components 902 a, b also includes a R/W drive or interface 918 to read from and write to one or more portable computer-readable tangible storage devices 920 such as a CD-ROM, DVD, memory stick, magnetic tape, magnetic disk, optical disk or semiconductor storage device. A software program, such as the software program 108 and the voice response program 110a and 110b can be stored on one or more of the respective portable computer-readable tangible storage devices 920, read via the respective R/W drive or interface 918 and loaded into the respective hard drive 916.

Each set of internal components 902 a, b may also include network adapters (or switch port cards) or interfaces 922 such as TCP/IP adapter cards, wireless wi-fi interface cards, or 3G or 4G wireless interface cards or other wired or wireless communication links. The software program 108 and the voice response program 110a in client computer 102 and the voice response program 110b in network server computer 112 can be downloaded from an external computer (e.g., server) via a network (for example, the Internet, a local area network or other, wide area network) and respective network adapters or interfaces 922. From the network adapters (or switch port adaptors) or interfaces 922, the software program 108 and the voice response program 110a in client computer 102 and the voice response program 110b in network server computer 112 are loaded into the respective hard drive 916. The network may comprise copper wires, optical fibers, wireless transmission, routers, firewalls, switches, gateway computers and/or edge servers.

Each of the sets of external components 904 a, b can include a computer display monitor 924, a keyboard 926, and a computer mouse 928. External components 904 a, b can also include touch screens, virtual keyboards, touch pads, pointing devices, and other human interface devices. Each of the sets of internal components 902 a, b also includes device drivers 930 to interface to computer display monitor 924, keyboard 926 and computer mouse 928. The device drivers 930, R/W drive or interface 918 and network adapter or interface 922 comprise hardware and software (stored in storage device 916 and/or ROM 910).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
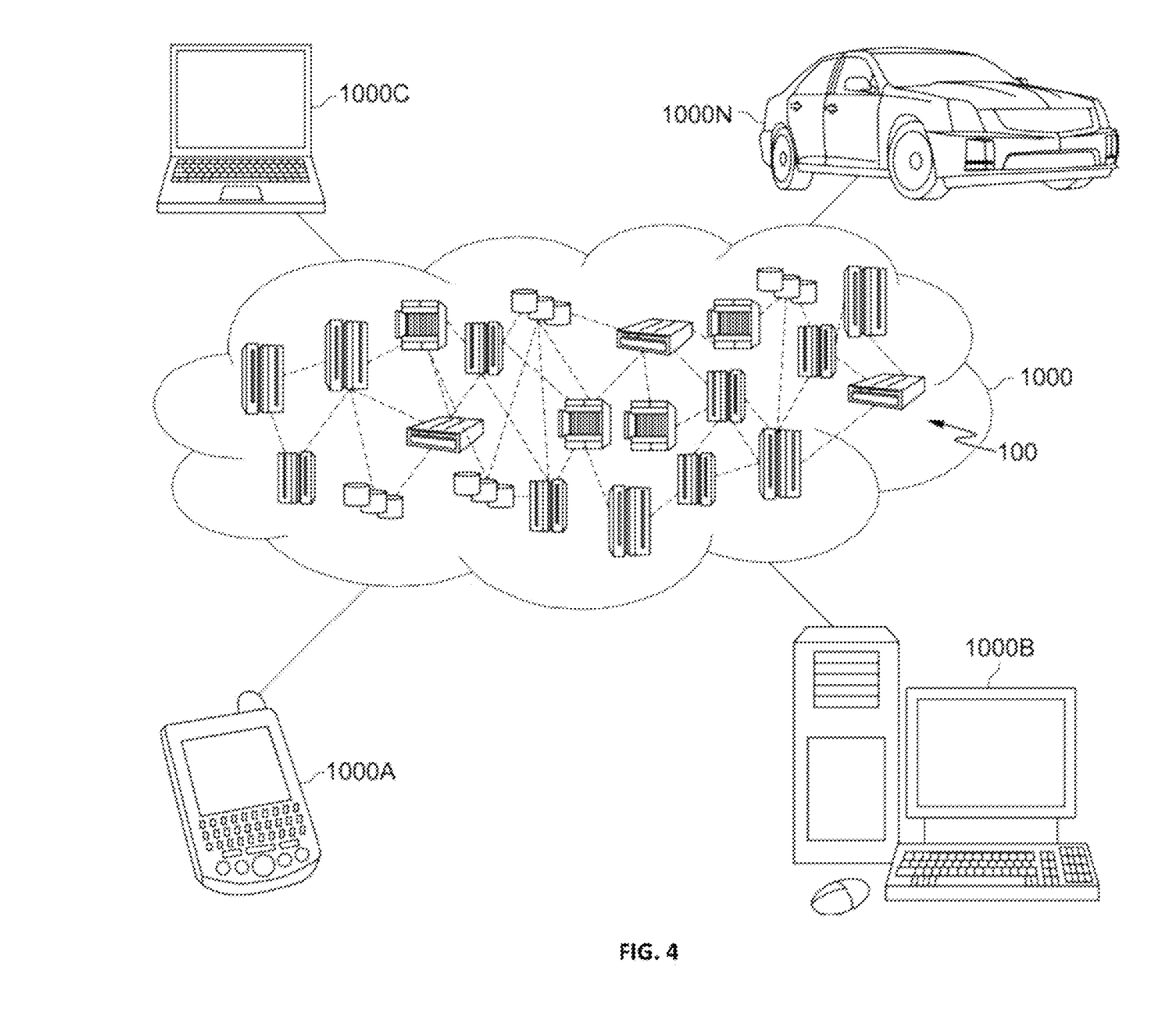
FIG. 4 is a block diagram of an illustrative cloud computing environment including the computer system depicted in FIG. 1, in accordance with an embodiment of the present disclosure.

Referring now to FIG. 4, illustrative cloud computing environment 1000 is depicted. As shown, cloud computing environment 1000 comprises one or more cloud computing nodes 100 with which local computing devices used by cloud consumers, such as, for example, personal digital assistant (PDA) or cellular telephone 1000A, desktop computer 1000B, laptop computer 1000C, and/or automobile computer system 1000N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1000A-N shown in FIG. 4 are intended to be illustrative only and that computing nodes 100 and cloud computing environment 1000 can communicate with any type of computerized device over any type of network and/or network addressable connection (e.g., using a web browser).

Figure 5:
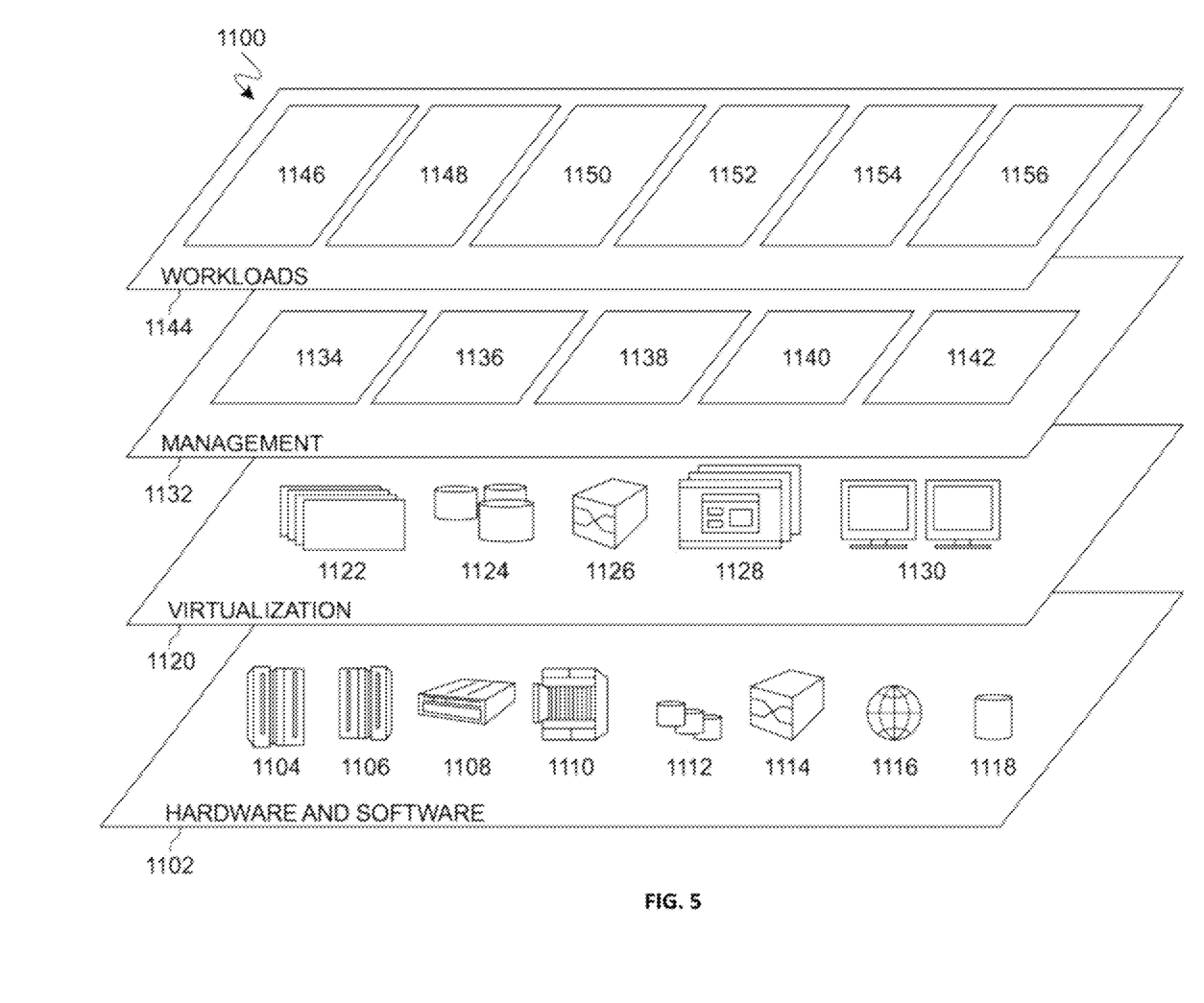
FIG. 5 is a block diagram of functional layers of the illustrative cloud computing environment of FIG. 4, in accordance with an embodiment of the present disclosure.

Referring now to FIG. 5, a set of functional abstraction layers 1100 provided by cloud computing environment 1000 is shown. It should be understood in advance that the components, layers, and functions shown in FIG. 5 are intended to be illustrative only and embodiments of the invention are not limited thereto. As depicted, the following layers and corresponding functions are provided:

Hardware and software layer 1102 includes hardware and software components. Examples of hardware components include: mainframes 1104; RISC (Reduced Instruction Set Computer) architecture based servers 1106; servers 1108; blade servers 1110; storage devices 1112; and networks and networking components 1114. In some embodiments, software components include network application server software 1116 and database software 1118.

Virtualization layer 1120 provides an abstraction layer from which the following examples of virtual entities may be provided: virtual servers 1122; virtual storage 1124; virtual networks 1126, including virtual private networks; virtual applications and operating systems 1128; and virtual clients 1130.

In one example, management layer 1132 may provide the functions described below. Resource provisioning 1134 provides dynamic procurement of computing resources and other resources that are utilized to perform tasks within the cloud computing environment. Metering and Pricing 1136 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1138 provides access to the cloud computing environment for consumers and system administrators. Service level management 1140 provides cloud computing resource allocation and management such that required service levels are met. Service Level Agreement (SLA) planning and fulfillment 1142 provide pre-arrangement for, and procurement of, cloud computing resources for which a future requirement is anticipated in accordance with an SLA.

Workloads layer 1144 provides examples of functionality for which the cloud computing environment may be utilized. Examples of workloads and functions which may be provided from this layer include: mapping and navigation 1146; software development and lifecycle management 1148; virtual classroom education delivery 1150; data analytics processing 1152; transaction processing 1154; and voice response 1156. A voice response program 110a, 110b provides a way to enable speech impaired users to communicate with the voice response systems using one or more connected devices, including alternative and augmentative communication devices.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for voice responses, the method comprising:
    gathering user data from at least one connected device, wherein the connected device comprises an artificial intelligence (AI) system that can observe human conversations and detect behavioral signals or biometric patterns of a user within a range of sensors used to detect the user's behavioral signals or biometric patterns;
    predicting when a user desires to submit a voice command and whether the user has the ability to submit the voice command, wherein heuristics and health conditions of the user are used to predict a topic of a voice command and voice request and to provide a spoken menu from which the user may choose at least one voice command;
    analyzing user speech stream data via natural language processing (NLP) algorithms to dynamically determine a satisfaction or frustration level of a user;
    passing the gathered user data to a random forest algorithm to perform a binary classification;
    training a voice response system based on the gathered user data, wherein the trained voice response system includes a plurality of voice menus, one of the plurality of voice menus being dynamically modified to include a set of hierarchical questions relating to an observed interaction or set of interactions with a user, until a customized menu is determined;
    using a deep reinforcement learning model, such as a long short term memory recurrent neural network model (LSTM-RNN), to improve a knowledge corpus by correlating gathered behavioral input, body language, and biometric signals with an intended topic or a hierarchical voice menu related to the intended topic;
    identifying a wakeup signal for the connected device based on observed behavioral signals or biometric patterns of the user within the range of the sensors used to detect the user's behavioral signals or biometric patterns, wherein the identified wakeup signal comprises a change in a behavior or a biometric parameter of the user;
    determining that user engagement is intended based on identifying the wakeup signal;
    handling a non-routine event of the user by initiating a phone call to a live person who may assist in understanding the non-routine event;
    determining the customized menu based on the intended user engagement; and
    engaging with the user through the at least one connected device.

2. The method of claim 1, wherein the at least one connected device is an augmentative and alternative communication device.

3. The method of claim 1, wherein training the voice response system based on the gathered user data further comprises:
    predicting a topic of a voice request using a long short term memory recurrent neural network.

4. The method of claim 1, wherein the wakeup signal is a change in a biometric parameter recorded on a connected Internet of Things (IoT) device.

5. The method of claim 1, wherein determining that user engagement is intended further comprises:
    using a random forest algorithm to perform a binary classification of the gathered user data; and
    using a long short-term memory (LSTM-RNN) model to determine how to proceed on engaging with the user.

6. The method of claim 1, wherein engaging with the user through the at least one connected device further comprises:
    providing the user with a customized menu based on the user data;
    analyzing user feedback; and
    predicting a user topic.

7. The method of claim 1, wherein the user data is stored in a database, and wherein the database is updated, based on engagement with the user, to correlate the user data with a user topic predicted by a long short term memory recurrent neural network.

8. The method of claim 7, wherein the plurality of voice menus are stored in the database, and wherein each of the plurality of voice menus is dynamically amended by the voice response system based on the gathered data.

9. A computer system for voice responses, comprising:
    one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:
    gathering user data from at least one connected device, wherein the connected device comprises an artificial intelligence (AI) system that can observe human conversations and detect behavioral signals or biometric patterns of a user within a range of sensors used to detect the user's behavioral signals or biometric patterns;

predicting when a user desires to submit a voice command and whether the user has the ability to submit the voice command, wherein heuristics and health conditions of the user are used to predict a topic of a voice command and voice request and to provide a spoken menu from which the user may choose at least one voice command;

analyzing user speech stream data via natural language processing (NLP) algorithms to dynamically determine a satisfaction or frustration level of a user;

passing the gathered user data to a random forest algorithm to perform a binary classification;

training a voice response system based on the gathered user data, wherein the trained voice response system includes a plurality of voice menus, one of the plurality of voice menus being dynamically modified to include a set of hierarchical questions relating to an observed interaction or set of interactions with a user, until a customized menu is determined;

using a deep reinforcement learning model, such as a long short term memory recurrent neural network model (LSTM-RNN), to improve a knowledge corpus by correlating gathered behavioral input, body language, and biometric signals with an intended topic or a hierarchical voice menu related to the intended topic;

identifying a wakeup signal for the connected device based on observed behavioral signals or biometric patterns of the user within the range of the sensors used to detect the user's behavioral signals or biometric patterns, wherein the identified wakeup signal comprises a change in a behavior or a biometric parameter of the user;

determining that user engagement is intended based on identifying the wakeup signal;

handling a non-routine event of the user by initiating a phone call to a live person who may assist in understanding the non-routine event;

determining the customized menu based on the intended user engagement; and engaging with the user through the at least one connected device.

10. The computer system of claim 9, wherein the at least one connected device is an augmentative and alternative communication device.

11. The computer system of claim 9, wherein training the voice response system based on the gathered user data further comprises:
predicting a topic of a voice request using a long short term memory recurrent neural network.

12. The computer system of claim 9, wherein the wakeup signal is a change in a biometric parameter recorded on a connected Internet of Things (IoT) device.

13. The computer system of claim 9, wherein determining that user engagement is intended further comprises:
using a random forest algorithm to perform a binary classification of the gathered user data; and
using a long short-term memory (LSTM-RNN) model to determine how to proceed on engaging with the user.

14. The computer system of claim 9, wherein engaging with the user through the at least one connected device further comprises:
providing the user with a customized menu based on the user data;
analyzing user feedback; and
predicting a user topic.

15. The computer system of claim 9, wherein the user data is stored in a database, and wherein the database is updated, based on engagement with the user, to correlate the user data with a user topic predicted by a long short term memory recurrent neural network.

16. The computer system of claim 15, wherein the plurality of voice menus are stored in the database, and wherein each of the plurality of voice menus is dynamically amended by the voice response system based on the gathered data.

17. A computer program product for voice responses, comprising:
one or more non-transitory computer-readable storage media and program instructions stored on at least one of the one or more tangible storage media, the program instructions executable by a processor to cause the processor to perform a method comprising:

gathering user data from at least one connected device, wherein the connected device comprises an artificial intelligence (AI) system that can observe human conversations and detect behavioral signals or biometric patterns of a user within a range of sensors used to detect the user's behavioral signals or biometric patterns;

predicting when a user desires to submit a voice command and whether the user has the ability to submit the voice command, wherein heuristics and health conditions of the user are used to predict a topic of a voice command and voice request and to provide a spoken menu from which the user may choose at least one voice command;

analyzing user speech stream data via natural language processing (NLP) algorithms to dynamically determine a satisfaction or frustration level of a user;

passing the gathered user data to a random forest algorithm to perform a binary classification;

training a voice response system based on the gathered user data, wherein the trained voice response system includes a plurality of voice menus, one of the plurality of voice menus being dynamically modified to include a set of hierarchical questions relating to an observed interaction or set of interactions with a user, until a customized menu is determined;

using a deep reinforcement learning model, such as a long short term memory recurrent neural network model (LSTM-RNN), to improve a knowledge corpus by correlating gathered behavioral input, body language, and biometric signals with an intended topic or a hierarchical voice menu related to the intended topic;

identifying a wakeup signal for the connected device based on observed behavioral signals or biometric patterns of the user within the range of the sensors used to detect the user's behavioral signals or biometric patterns, wherein the identified wakeup signal comprises a change in a behavior or a biometric parameter of the user;

determining that user engagement is intended based on identifying the wakeup signal;

handling a non-routine event of the user by initiating a phone call to a live person who may assist in understanding the non-routine event;

determining the customized menu based on the intended user engagement; and engaging with the user through the at least one connected device.

18. The computer program product of claim 17, wherein the at least one connected device is an augmentative and alternative communication device.

19. The computer program product of claim 17, wherein training the voice response system based on the gathered user data further comprises:
  predicting a topic of a voice request using a long short term memory recurrent neural network.

20. The computer program product of claim 17, wherein the wakeup signal is a change in a biometric parameter recorded on a connected Internet of Things (IoT) device.

21. The computer program product of claim 17, wherein determining that user engagement is intended further comprises:
  using a random forest algorithm to perform a binary classification of the gathered user data; and
  using a long short-term memory (LSTM-RNN) model to determine how to proceed on engaging with the user.

22. The computer program product of claim 17, wherein engaging with the user through the at least one connected device further comprises:
  providing the user with a customized menu based on the user data;
  analyzing user feedback; and
  predicting a user topic.

23. The computer program product of claim 17, wherein the user data is stored in a database, and wherein the database is updated, based on engagement with the user, to correlate the user data with a user topic predicted by a long short term memory recurrent neural network.

* * * * *